(12) United States Patent
Mao et al.

(10) Patent No.: US 7,356,826 B2
(45) Date of Patent: Apr. 8, 2008

(54) DISK PLAYER CASING WITH BUFFERED LID

(75) Inventors: Jun-Feng Mao, Shenzhen (CN); Wen-Jie Bao, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 323 days.

(21) Appl. No.: 11/188,811

(22) Filed: Jul. 25, 2005

(65) Prior Publication Data

US 2006/0026613 A1    Feb. 2, 2006

(30) Foreign Application Priority Data

Jul. 30, 2004    (CN)    .................. 2004 2 0072326 U

(51) Int. Cl.
G11B 33/02    (2006.01)
(52) U.S. Cl. ...................................... 720/655
(58) Field of Classification Search ............... 720/655; 369/72; 16/272, 303; 4/239; 206/755; 403/65; 220/831; D14/168
See application file for complete search history.

(56) References Cited

U.S. PATENT DOCUMENTS

| 4,356,594 | A |   | 11/1982 | Grosemans |   |
|---|---|---|---|---|---|
| 4,562,566 | A |   | 12/1985 | Eisemann |   |
| 5,341,357 | A |   | 8/1994 | Mukawa et al. |   |
| 5,355,357 | A |   | 10/1994 | Yamamori et al. |   |
| 5,573,120 | A | * | 11/1996 | Kaufman et al. | ........... 206/755 |
| 5,704,094 | A | * | 1/1998 | Hartigan et al. | ............... 16/303 |
| 6,053,589 | A | * | 4/2000 | Lin | ............................. 312/271 |
| D430,135 | S | * | 8/2000 | Isonaga | ..................... D14/168 |
| 6,128,265 | A |   | 10/2000 | Leung |   |
| 6,163,927 | A | * | 12/2000 | Leu | .............................. 16/272 |
| 6,449,780 | B1 | * | 9/2002 | Merry | ........................... 4/239 |
| 6,739,474 | B1 | * | 5/2004 | Wang | .......................... 220/831 |
| 2002/0044513 | A1 | * | 4/2002 | Weng | .......................... 369/72 |
| 2002/0164197 | A1 | * | 11/2002 | Lee | .............................. 403/65 |

FOREIGN PATENT DOCUMENTS

CN    00253944    9/2001

* cited by examiner

*Primary Examiner*—Tianjie Chen
(74) *Attorney, Agent, or Firm*—Morris Manning Martin LLP; Tim Tingkang Xia, Esq.

(57) ABSTRACT

A casing (10) for a disk player includes a housing (12), a lid (14) movable with respect to said housing between an open position and a closed position, and a resilient member (64). The housing houses a disk playing mechanism of said disk player, and defines two cavities (620, 622) and a buffer (624). The lid has a supporting member (60) being extendable into a first one of the cavities and being engageable with said buffer so as to buffer movement of said lid with respect to said housing. The resilient member is installed in a second one of the cavities, so as to resiliently provide movement of said lid with respect to said housing.

20 Claims, 5 Drawing Sheets

DISK PLAYER CASING WITH BUFFERED LID

BACKGROUND

1. Field of the Invention

The present invention generally relates to disk players for reproducing information signals recorded on an information disk such as an optical disk, and more particularly to a casing for a disk player which comprises a housing and a lid rotatably connected to the housing.

2. Related Art

A conventional portable disk player generally has a main body mounted on a chassis, and a lid pivotally connected to the chassis by a connecting means. Thus, the lid can be opened and closed, for unloading and loading an optical disk from and onto the main body. The connecting means usually includes a pair of engaging portions formed on a rear of the lid, and a pair of connecting portions formed on the housing and respectively abutting the engaging portions. A pair of pivots is movably received in the connecting portions respectively. Each pivot has one end elastically contacting the corresponding connecting portion, and an opposite end extending through the connecting portion and engaging with a corresponding engaging portion. A recess is located between the two connecting portions, and a rail is retained in the recess. A torque spring is located in the recess, with opposite helical portions of the spring engaged around the rail. Opposite ends of the spring abut against the recess, and a central portion of the spring between helical portions biases against the lid. Thus the spring can lift the lid from a closed position to a raised, open position.

However, the above-described hinging structure is rather complex, and it is inconvenient for an operator to manually assemble the outer casing during mass manufacture of the optical disk player. This reduces the speed, precision and efficiency of commercial production of the disk player.

Therefore, a heretofore unaddressed need exists in the industry to address aforementioned deficiencies and inadequacies.

SUMMARY

One embodiment provides a casing for a disk player. The casing includes a housing, a lid movable with respect to said housing between an open position and a closed position, and a resilient member. The housing houses a disk playing mechanism of said disk player, and defines two cavities and a buffer. The lid has a supporting member being extendable into a first one of the cavities and being engageable with said buffer so as to buffer movement of said lid with respect to said housing. The resilient member is installed in a second one of the cavities, so as to resiliently provide movement of said lid with respect to said housing.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF A PREFERRED EMBODIMENT

Hereinafter, an embodiment of a casing for a disk player for multimedia outputs according to the present invention will be described in detail with reference to the accompanying drawings.

Figure 1:
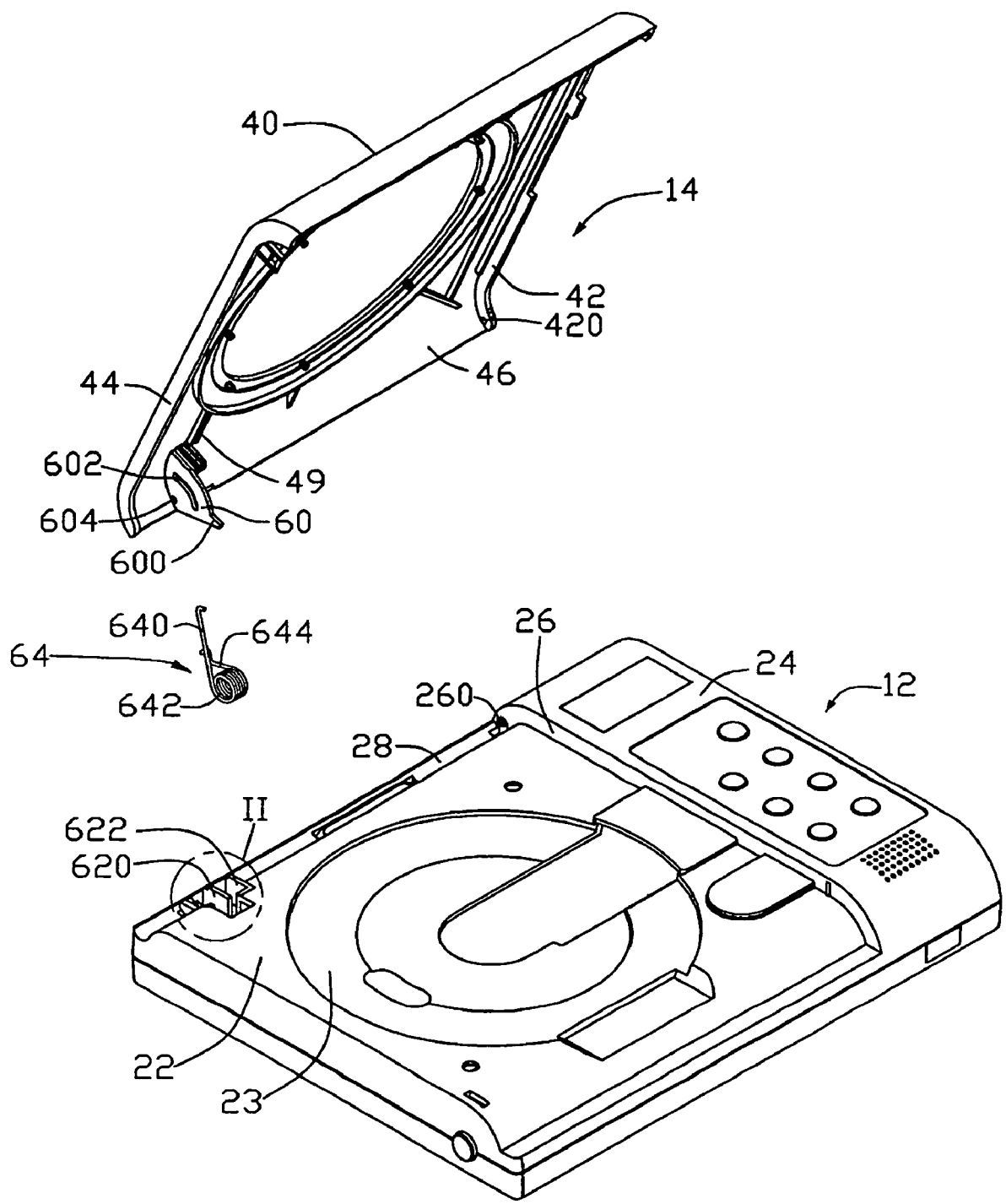
FIG. 1 is an exploded, isometric view of a casing for an optical disk player according to a preferred embodiment of the present invention.

Referring to FIG. 1, the casing 10 includes a generally flat rectangular housing 12, and a generally rectangular lid 14 rotatably hinged to the housing 12. The housing 12 houses a disk playing mechanism (not shown) therein. The disk playing mechanism includes a spindle motor (not shown) for supporting and rotating an optical disk (not shown), and an optical pickup unit (not shown) moving along a radial path of the optical disk for reading information from the optical disk.

The housing 12 defines a main bed 22 on an upper surface thereof. The housing 12 includes a long, recessed engaging portion 28 smoothly adjoining a rear side (not labeled) of the main bed 22, and a rectangular raised portion adjacent both a lateral side of the main bed 22 and a right end of the engaging portion 28. The raised portion functions as a control panel 24. An array of operating keys (not labeled) is mounted on the control panel 24, by which users control reading out of information recorded on the optical disk. A round recess 23 is defined in a center of the main bed 22, for accommodating the optical disk.

The lid 14 is pivotably connected to the engaging portion 28 by hinging means provided at the engaging portion 28 and on the lid 14. The lid 14 can be rotated down to a closed position, in which it covers the entire main bed 22 and is approximately coplanar with the control panel 24. The lid 14 can be rotated up to an open position (as in FIG. 4), in which the round recess 23 is accessible so that the optical disk can be loaded or unloaded.

Figure 2:
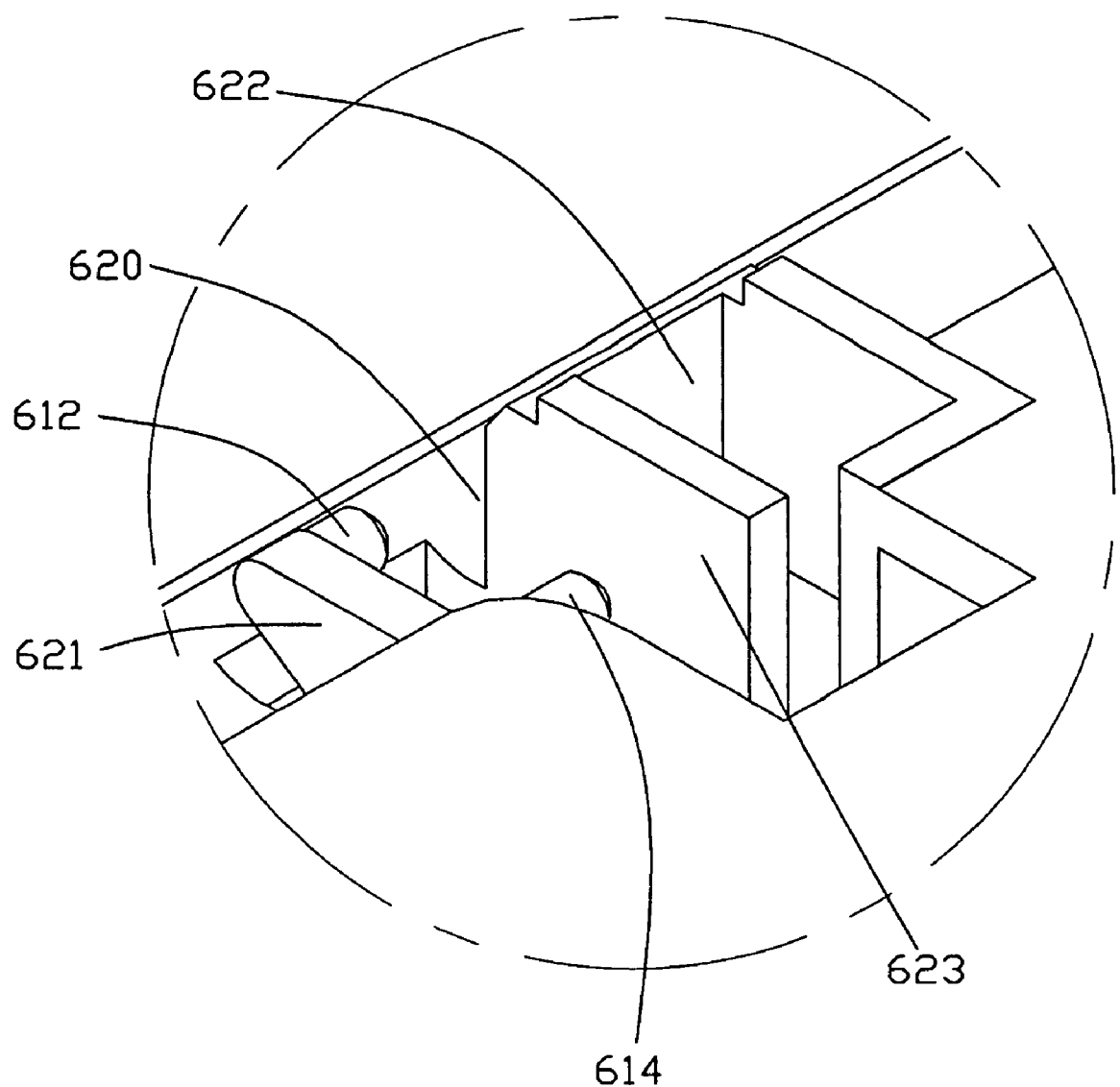
FIG. 2 is an enlarged view of a circled portion II of FIG. 1.

Also referring to FIG. 2, a first cavity 620 and an adjacent second cavity 622 are defined in a left side of the engaging portion 28 and an adjoining portion (not labeled) of the housing 12 at the main bed 22. The two cavities 620 and 622 are separated by a middle wall 623. A block 621 is provided in the first cavity 620, the block 621 spanning generally between the main bed 22 and a rear edge of the engaging portion 28. A first pivot pin 612 and a slide pin 614 extend horizontally in a same direction from the block 621 into the first cavity 620. The first pivot pin 612 and slide pin 614 engage with the hinging means provided at the lid 14, so that the lid 14 can be pivoted between the open position and the closed position.

Referring to FIG. 1 again, the housing 12 also includes a connecting wall 26, which interconnects the main bed 22 and the engaging portion 28 with the control panel 24. A second pivot pin 260 horizontally extends from the connecting wall 26 above the right end of the engaging portion 28 toward the first pivot pin 612. The second pivot pin 260 has a beveled free end (not labeled), for easily assembling the lid 14 to the housing 12.

Figure 3:
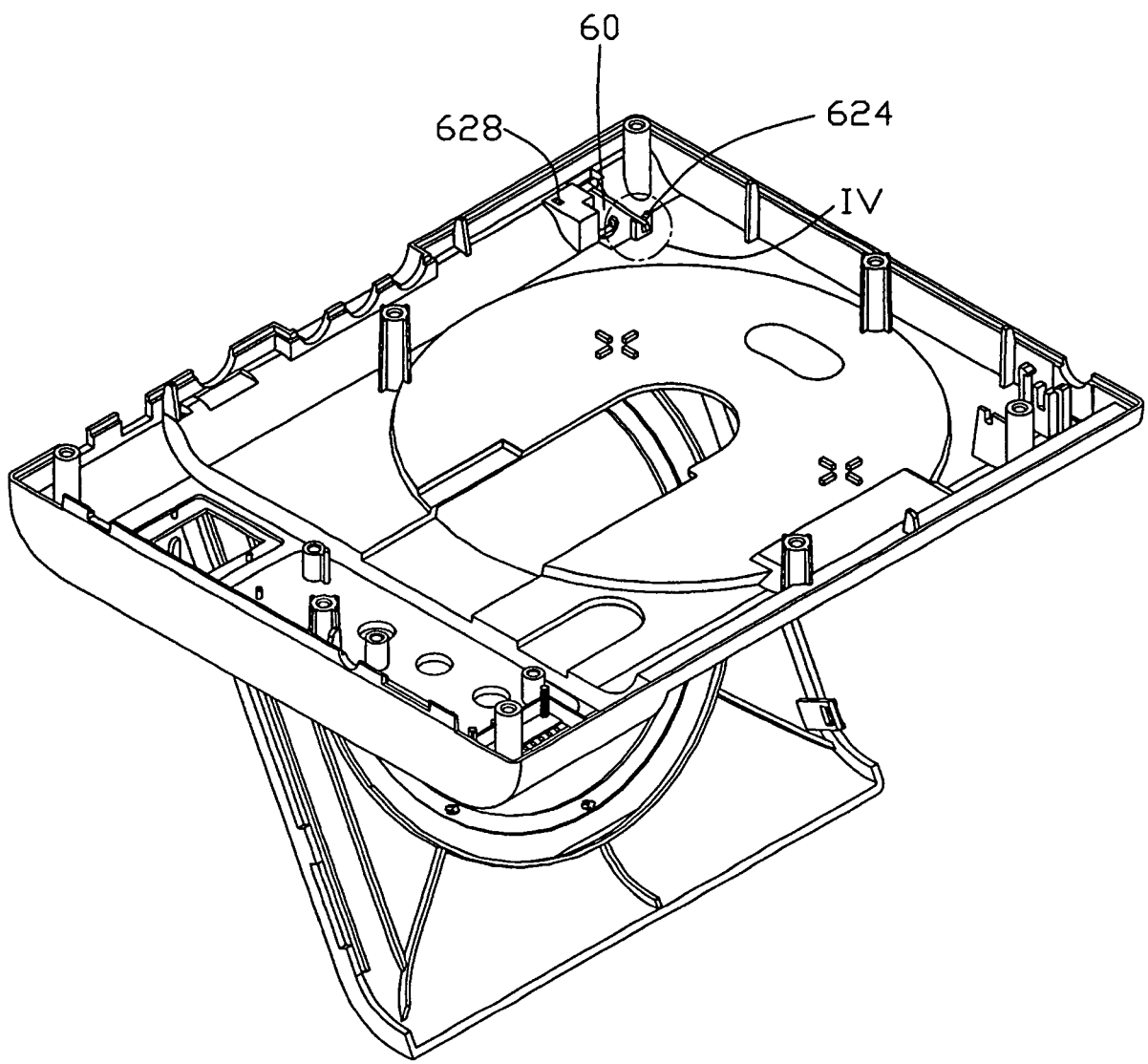
FIG. 3 is an inverted, assembled view of the casing of FIG. 1, but not showing a resilient member thereof.
Figure 4:
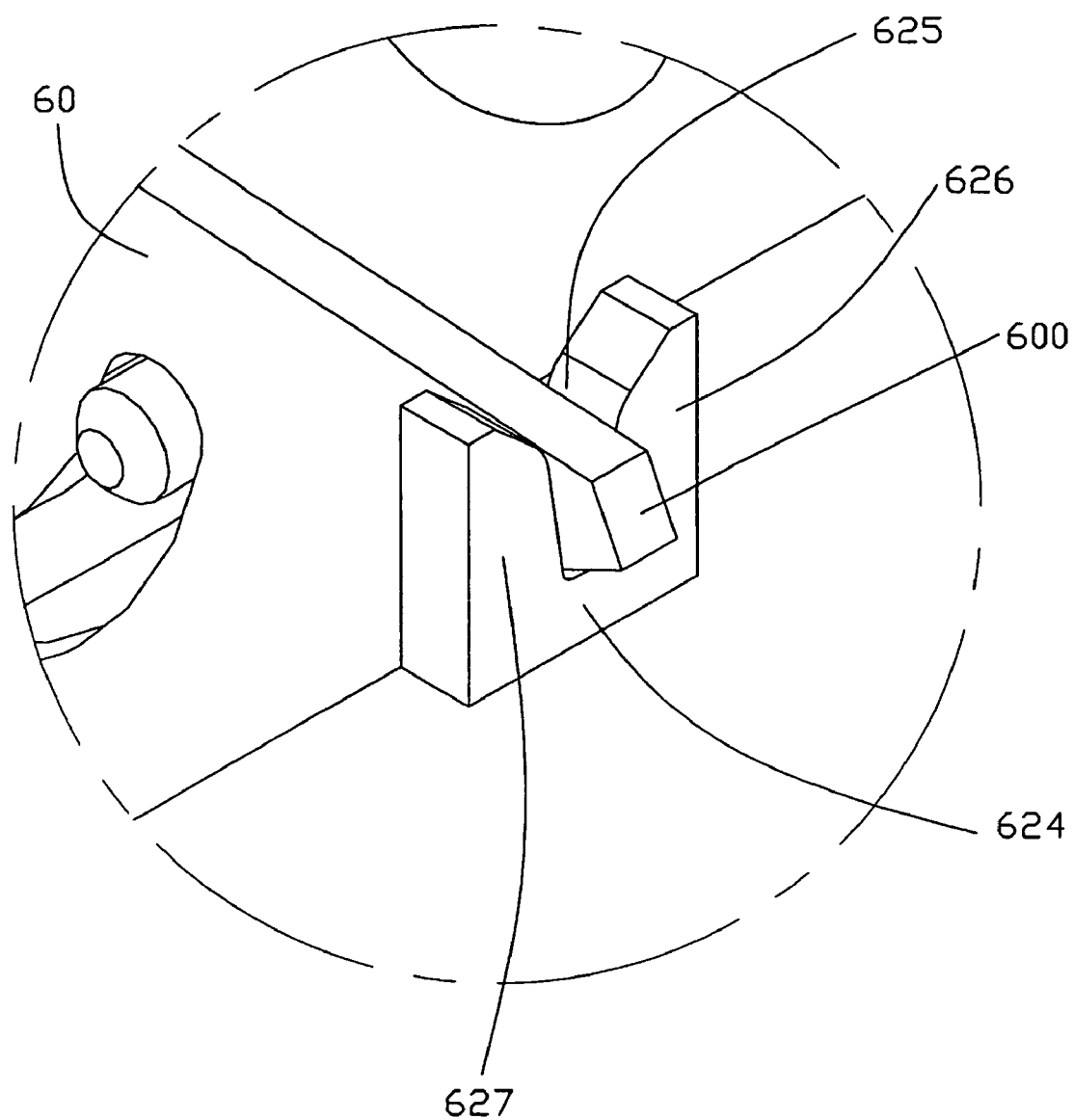
FIG. 4 is an enlarged view of a circled portion IV of FIG. 3.
Figure 5:
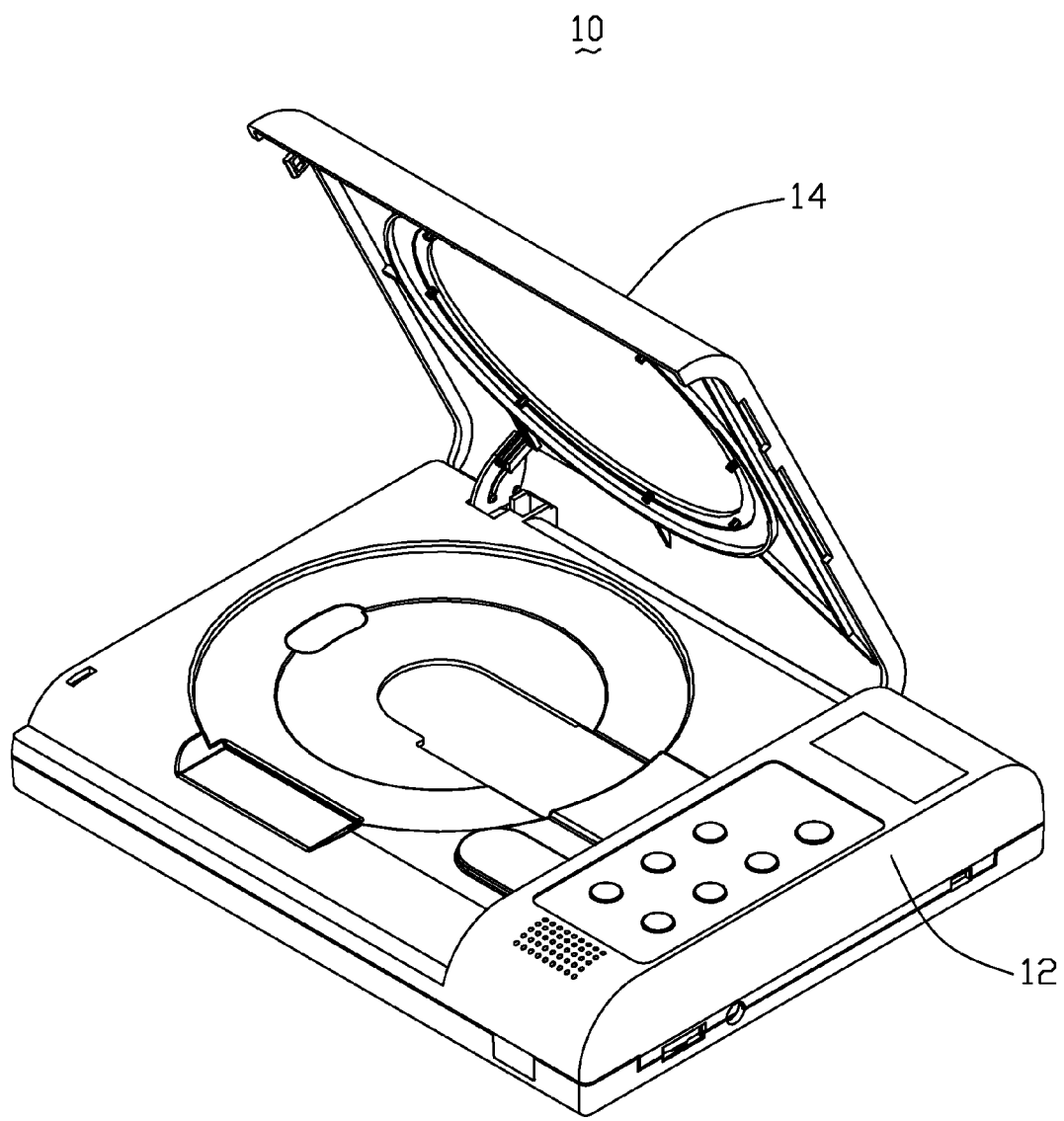
FIG. 5 is an assembled view of the casing of FIG. 1, but viewed from another aspect and not showing the resilient member thereof.

Referring to FIGS. 3 and 4, a buffer 624 made of flexible plastic extends downwardly from the main bed 22. The buffer 624 is adjacent to the first cavity 620, and defines a groove 625 bounded by two opposite walls 626 and 627. A width of the groove 625 progressively decreases from an open end (not labeled) thereof to an inmost end thereof. The walls 626 and 627 of the buffer 624 are elastically deformable.

The lid 14 has a main panel 40, and a pair of flanges 44 and 42 extending down from two opposite lateral sides of the main panel 40 respectively. The lid 14 thus has a very shallow U-shaped cross-section. The main panel 40 also has a curved portion 46, for abutting the rear edge of the engaging portion 28 of the housing 12. A plate-like supporting member 60 perpendicularly extends from a common interior surface of a rear corner of the main panel 40 and the curved portion 46, corresponding to the first cavity 620. The supporting member 60 defines an arcuate guide slot 602 and a first pivot hole 604. The first pivot hole 604 is located at the center of an imaginary circle of which the guide slot 602 forms a part. A radius of the circle is equal to the distance between the slide pin 614 and the first pivot pin 612 of the housing 12. An extending portion 600 is formed on a bottom side of the supporting member 60. The extending portion 600 has a beveled edge (not labeled) adapted to interferingly engage in the groove 625 of the buffer 624. In particular, the open end of the groove 625 is wider than the extending portion 600, and the inmost end of the groove 625 is narrower than the extending portion 600. The two opposite walls 626 and 627 of the buffer 624 are deformable when the extending portion 600 is received in the groove 625.

A second pivot hole 420 is defined in a rear end of the flange 42. The first and second pivot holes 420 and 604 are aligned along a pivot axis (not shown), for rotatable connection of the lid 14 to the housing 12. A pair of parallel ribs 49 is formed on the interior surface of the main panel 40. The ribs 49 are parallel to the flanges 42 and 44, and extend forward from the supporting member 60.

A resilient member 64 is interposed between the housing 12 and the lid 14, for resiliently biasing the lid 14 in a direction toward the open position. The resilient member 64 overcomes the force of gravity which would otherwise bias the lid 14.

In the illustrated embodiment, the resilient member 64 is a wire torque spring. The resilient member 64 has a helical part 642, and a connecting part 640 and a fixing part 644 extending from opposite ends of the helical part 642 respectively. The helical part 642 is lodged in the second cavity 622 of the housing 12, with the connecting part 640 protruding up from the second cavity 622. The connecting part 640 has a bent free end (not labeled), which serves to transmit spring force to the lid 14. The fixing part 644 threads through a hole 628 (shown in FIG. 3) defined at a bottom of the second cavity 622, so as to fix the helical part 642 in the second cavity 622.

When assembling the lid 14 onto the housing 12, the curved portion 46 of the main panel 40 of the lid 14 is set above the engaging portion 28 of the housing 12. The supporting member 60 is inserted into the first cavity 620 until the supporting member 60 abuts the block 621. In this process, the first pivot pin 612 of the housing 12 is received through the first pivot hole 604 of the lid 14, and simultaneously the slide pin 614 of the housing 12 is received through the guide slot 602 of the lid 14. The bent free end of the connecting part 640 of the resilient member 64 is located between the ribs 49, and presses against the interior surface of the main panel 40 thereat. Finally, the flange 42 of the lid 14 is deformed leftward slightly, so as to enable the second pivot pin 260 to be received and retained in the second pivot hole 420. The lid 14 is thus readily to hinged to the housing 12.

After an optical disk is placed onto the round recess 23 of the housing 12 by a user, the lid 14 is pressed down from the open position. The lid 14 rotates down and is locked in the closed position by a locking mechanism (not labeled) provided on front corners of the lid 14 and the housing 12. In this process, the resilient member 64 deforms and acquires elastic potential energy. When the locking mechanism is unlocked by the user, the lid 14 is released from the housing 12, the resilient member 64 rebounds, and the lid 14 automatically rotates up to the open position under force of the resilient member 64. In this process, the extending portion 600 of the supporting member 60 is progressively received into the groove 625 of the buffer 624 and elastically deforms the walls 626, 627. Therefore, the rotating speed of the lid 14 can be moderated by the interfering engagement between the supporting member 60 and the buffer 624. Any risk of the lid 14 shaking or being damaged during the opening process is reduced.

In the illustrated embodiment, the buffer 624 formed in the housing 12 is deformable for interferingly engaging with the supporting member 60 of the lid 14. In alternative embodiments, the supporting member 60 can be resilient; the buffer 624 also can be formed on the lid 14 to interferingly engage with a corresponding element of the housing 12.

It should be emphasized that the above-described embodiment is merely one example of implementation of the present invention, and has been provided for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and to be protected by the following claims.

What is claimed is:

1. A casing for a disk player, the casing comprising:
   a housing for housing a disk playing mechanism of said disk player, said housing defining two cavities and a buffer that is flexible;
   a lid movable with respect to said housing between an open position and a closed position, said lid including a supporting member being extendable into a first one of the cavities and being engageable with said buffer so as to buffer movement of said lid with respect to said housing; and
   a resilient member installed in a second one of the cavities, so as to resiliently provide movement of said lid with respect to said housing.

2. The casing in accordance with claim 1, wherein said buffer is formed adjacent at least one of the cavities, said buffer defines a groove, and said supporting member is interferingly received in said groove in the open position.

3. The casing in accordance with claim 2, wherein said buffer is formed in said housing, and an extending portion formed at a bottom side of said supporting member is engageable with said buffer.

4. The casing in accordance with claim 3, wherein said extending portion of said supporting member has a beveled edge adapted to interferingly engage in said groove of said buffer.

5. The casing in accordance with claim 3, wherein said buffer further includes two elastically deformable walls at opposite sides of said groove respectively.

6. The casing in accordance with claim 5, wherein said extending portion of said supporting member has a width slightly larger than a width of an inmost end of said groove, and smaller than a width of an open end of said groove.

7. The casing in accordance with claim 6, wherein the width of said groove progressively decreases from the opening end thereof to the inmost end thereof.

8. The casing in accordance with claim 1, wherein the cavities are adjacent to each other.

9. The casing in accordance with claim 8, wherein two pins extend into one of said cavities and are movably engaged with said supporting member, so that said lid is pivotably engaged with said housing.

10. The casing in accordance with claim 9, wherein said supporting member defines a first pivot hole pivotably receiving a first one of the pins, and further defines a guide slot slidably receiving a second one of the pins.

11. The casing in accordance with claim 10, wherein said guide slot is arcuate, and said first pivot hole is located at the center of an imaginary circle of which said guide slot forms a part.

12. The casing in accordance with claim 10, wherein said housing comprises a third pin opposite from the first pin, and the third pin is adapted to pivotably engage with said lid.

13. The casing in accordance with claim 12, wherein the third pin has a beveled free end.

14. The casing in accordance with claim 12, wherein said lid defines a second pivot hole, and the third pin is pivotably received in said second pivot hole.

15. The casing in accordance with claim 14, wherein at least one of the second and third pins is insertable into the corresponding first and/or second pivot holes by deforming the lid.

16. A casing for disk player, the casing comprising:
a housing for housing a disk playing mechanism of said disk player, said housing having at least two cavities beside said disk playing mechanism;
a lid movable with respect to said housing between an open position, said lid having a supporting member formed corresponding to one of said at least two cavities, and said supporting member being extendable into said one of said at least two cavities;
a resilient member installed in another of said at least two cavities to resiliently provide movement of said lid relative to said housing; and
a buffering means includes one deformable member formed at one of said housing and said lid and an engaging member formed at another one of said housing and said lid for interferingly engaging with said deformable member.

17. The casing in accordance with claim 16, wherein the engaging member of the buffering means is deformable.

18. A player for multimedia outputs, the casing comprising:
a housing adapted to house a playing mechanism of said player for said outputs, said housing defining a buffer therein; and
a lid movably covering said playing mechanism beside said housing and movable with respect to said housing between an open position thereof to expose said playing mechanism to an outside of said housing, and a closed position thereof to cover said playing mechanism away from said outside of said housing, said lid comprising an extension portion extensible into said housing, and engagement of said extension portion and said buffer capable of reducing a moving speed of said lid along at least one direction from said closed position thereof to said open position thereof,
wherein said buffer defines a groove for interferingly receiving said extension portion in said open position.

19. The casing in accordance with claim 18, wherein the extension portion has a beveled edge adapted to interferingly engage in the groove of the buffer.

20. The casing in accordance with claim 18, wherein the extension portion has a width slightly larger than a width of an inmost end of the groove, and smaller than a width of an open end of the groove.

* * * * *